(12) United States Patent
Shimizu et al.

(10) Patent No.: US 11,453,250 B2
(45) Date of Patent: Sep. 27, 2022

(54) PNEUMATIC TIRE FOR PASSENGER VEHICLE

(71) Applicant: The Yokohama Rubber Co., LTD., Tokyo (JP)

(72) Inventors: Masatoshi Shimizu, Hiratsuka (JP); Masatoshi Kuwajima, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 1031 days.

(21) Appl. No.: 14/911,232

(22) PCT Filed: Aug. 12, 2013

(86) PCT No.: PCT/JP2013/071781
§ 371 (c)(1),
(2) Date: Feb. 9, 2016

(87) PCT Pub. No.: WO2015/022720
PCT Pub. Date: Feb. 19, 2015

(65) Prior Publication Data
US 2016/0176241 A1    Jun. 23, 2016

(51) Int. Cl.
*B60C 3/00*    (2006.01)
*B60C 15/06*   (2006.01)
(Continued)

(52) U.S. Cl.
CPC ............ *B60C 15/0603* (2013.01); *B60C 5/14* (2013.01); *B60C 9/0042* (2013.01); *B60C 9/02* (2013.01);
(Continued)

(58) Field of Classification Search
CPC ....... B60C 2011/0033; B60C 2013/007; B60C 3/04; B60C 11/0083; B60C 13/003; B60C 15/0603
See application file for complete search history.

(56) References Cited

U.S. PATENT DOCUMENTS 5,385,192 A    1/1995  Hashimura et al.
6,079,465 A *  6/2000  Takeyama ............. B60C 1/0008
                                                152/510
(Continued)

FOREIGN PATENT DOCUMENTS

JP    S60-234008    11/1985
JP    H01-145202     6/1989
(Continued)

OTHER PUBLICATIONS

Machine Translation: JP-2012176694-A; Ono, Yasuaki (Year: 2018).*
(Continued)

*Primary Examiner* — Kendra Ly
(74) *Attorney, Agent, or Firm* — Thorpe North & Western

(57) ABSTRACT

In a pneumatic tire, a carcass layer is between bead portions, a bead core is in each bead portion, a reinforcement layer is on an outer side of the carcass layer, and a tread rubber layer is on the outer side of the reinforcement layer. A pair of first boundary lines passes through an intersection of an extension of a side arc forming a tread profile and an extension of a shoulder arc and orthogonal to a tire inner surface, a pair of second boundary lines passes through a rim check line and orthogonal to the tire inner surface, first to third regions are defined which have cross sectional areas of SA, SB, and SC, respectively, and the first to third regions respectively have lengths of a, b, and c along the tire inner surface such that $7.5 \leq SA/a \leq 11.5$ and $2.0 \leq SB/b \leq 6.0$ are satisfied.

10 Claims, 2 Drawing Sheets

(51) Int. Cl.
  *B60C 5/14* (2006.01)
  *B60C 9/08* (2006.01)
  *B60C 11/00* (2006.01)
  *B60C 15/024* (2006.01)
  *B60C 13/00* (2006.01)
  *B60C 11/01* (2006.01)
  *B60C 9/00* (2006.01)
  *B60C 9/02* (2006.01)
  *B60C 9/20* (2006.01)
  *B60C 9/04* (2006.01)

(52) U.S. Cl.
  CPC ............ *B60C 9/2003* (2013.01); *B60C 11/00* (2013.01); *B60C 11/0083* (2013.01); *B60C 11/01* (2013.01); *B60C 13/00* (2013.01); *B60C 13/003* (2013.01); *B60C 15/0242* (2013.01); *B60C 2009/0035* (2013.01); *B60C 2009/0425* (2013.01); *B60C 2009/0441* (2013.01); *B60C 2011/0033* (2013.01); *B60C 2013/007* (2013.01); *B60C 2015/061* (2013.01); *Y02T 10/86* (2013.01)

(56) References Cited

U.S. PATENT DOCUMENTS

| | | | | |
|---|---|---|---|---|
| 6,213,182 | B1 * | 4/2001 | Hanya | B60C 3/04 |
| | | | | 152/454 |
| 6,334,919 | B1 | 1/2002 | Takeyama et al. | |
| 6,527,025 | B1 * | 3/2003 | Minami | B60C 5/12 |
| | | | | 152/527 |
| 2001/0041762 | A1 * | 11/2001 | Ikawa | C08L 77/00 |
| | | | | 524/262 |
| 2005/0103419 | A1 | 5/2005 | Yamamoto | |
| 2011/0297283 | A1 | 12/2011 | Kouno et al. | |
| 2014/0138002 | A1 | 5/2014 | Katayama | |

FOREIGN PATENT DOCUMENTS

| | | | |
|---|---|---|---|
| JP | H04-221208 | | 8/1992 |
| JP | H05-162506 | | 6/1993 |
| JP | H05-193311 | | 8/1993 |
| JP | H05-254308 | | 10/1993 |
| JP | H05-345506 | | 12/1993 |
| JP | H08-259741 | | 10/1996 |
| JP | 10086606 A | * | 4/1998 |
| JP | 11321217 A | * | 11/1999 |
| JP | 2006/131082 | | 5/2006 |
| JP | 2006-327468 | | 12/2006 |
| JP | 2010-120479 | | 6/2010 |
| JP | 2011-005946 | | 1/2011 |
| JP | 2011-183993 | | 9/2011 |
| JP | 2012-176694 | | 9/2012 |
| JP | 2012176694 A | * | 9/2012 |
| JP | 2013-132989 | | 7/2013 |
| WO | WO 03/082609 | | 10/2003 |
| WO | WO 2010/095688 | | 8/2010 |
| WO | WO 2012/176372 | | 12/2012 |

OTHER PUBLICATIONS

Machine Translation: JP-11321217-A; Yamashita, Bunichi; (Year: 2018).*

Machine Translation: JP-10086606-A; Sato, Takayuki; (Year: 2019).*

International Search Report for International Application No. PCT/JP2013/071781 dated Sep. 24, 2013, 5 pages, Japan.

* cited by examiner

PNEUMATIC TIRE FOR PASSENGER VEHICLE

TECHNICAL FIELD

The present technology relates to a pneumatic tire suitable as a standard tire mounted on a passenger vehicle, and particularly relates to a pneumatic tire for a passenger vehicle such that the tire weight and rolling resistance can be greatly decreased without detracting from necessary tire performance.

BACKGROUND

A pneumatic tire for a passenger vehicle normally includes a tread portion that extends in a tire circumferential direction to form an annular shape, a pair of side wall portions disposed on both sides of the tread portion, and a pair of bead portions disposed on inner sides in a tire radial direction of the side wall portions. Such a pneumatic tire has a structure in which a carcass layer is laid between the pair of bead portions, a bead core is embedded in each bead portion, a belt layer is disposed on the outer periphery side of the carcass layer, and a tread rubber layer is stacked on the outer periphery side of the belt layer.

In such a pneumatic tire, from the viewpoints of resource saving and energy saving, reducing the weight of tire components to reduce the weight of the overall tire and decrease rolling resistance has been proposed (see, for example, Japanese Unexamined Patent Application Publication Nos. H5-193311A, H5-254308A, H5-345506A and 2006-131082A).

Nevertheless, conventional technologies have focused on individual areas of the pneumatic tire in attempts to achieve reductions in weight, resulting in failure to greatly decrease the tire weight and rolling resistance as well as inadequate consideration of the inconveniences that occur when each region of the pneumatic tire is greatly decreased.

SUMMARY

The present technology provides a pneumatic tire for a passenger vehicle such that the tire weight and rolling resistance can be greatly decreased without detracting from necessary tire performance.

A pneumatic tire for a passenger vehicle of the present technology includes: a tread portion extending in a tire circumferential direction to form an annular shape, a pair of side wall portions disposed on both sides of the tread portion, and a pair of bead portions disposed on inner sides in a tire radial direction of the side wall portions. In such a pneumatic tire, at least one carcass layer is laid between the pair of bead portions, a bead core is embedded in each bead portion, at least one reinforcement layer is disposed on the outer periphery side of the carcass layer, and a tread rubber layer is stacked on the outer periphery side of the reinforcement layer.

When a tread profile which forms a contour of the tread portion in the tire meridian cross section includes side arcs positioned on the outermost sides in a tire width direction of the tread portion, and shoulder arcs positioned on the inner sides in the tire width direction of the side arcs; a pair of first boundary lines is defined, each passing through a point of intersection of an extension of the side arc and an extension of the shoulder arc and orthogonal to a tire inner surface; the side wall portions each include a rim check line that extends in the tire circumferential direction; a pair of second boundary lines is defined, each passing through the rim check line in a tire meridian cross section and orthogonal to the tire inner surface; a first region is defined between the pair of first boundary lines; a second region is defined between the first boundary line and the second boundary line; a third region is defined from the second boundary line to a bead toe; the first to the third regions have cross-sectional areas ($mm^2$) of SA, SB, and SC, respectively; and the first to the third regions have periphery lengths (mm) of a, b, and c, respectively, along the tire inner surface, relationships such that $7.5 \leq SA/a \leq 11.5$ and $2.0 \leq SB/b \leq 6.0$ are satisfied with respect to the ratios SA/a and SB/b.

According to the present technology, when the pneumatic tire is partitioned into the first region to the third region by the first boundary lines and the second boundary lines defined as described above, and the cross-sectional areas SA, SB, and SC of the first to the third regions are divided by the periphery lengths a, b, and c along the tire inner surface of the first to the third regions, the relationships such that $7.5 \leq SA/a \leq 11.5$ and $2.0 \leq SB/b \leq 6.0$ are satisfied with respect to the ratios SA/a and SB/b, thereby suppressing volumes of the first region and the second region of the pneumatic tire to necessary minimums, making it possible to greatly reduce the tire weight and thus to greatly decrease the rolling resistance without detracting from tire performance factors such as wear resistance and cut resistance. As a result, it is possible to improve a fuel consumption of the vehicle, significantly contribute to resource saving and energy saving, and decrease the amount of carbon dioxide discharged from the vehicle.

In the present technology, a relationship such that $4.0 \leq SC/c \leq 8.0$ is preferably satisfied with respect to the ratio SC/c. As a result, a volume of the third region of the pneumatic tire is suppressed to the necessary minimum, making it possible to greatly decrease the tire weight and rolling resistance without detracting from fitting characteristics and particularly rim disengagement resistance.

Further, when the first region of the tread rubber layer has a cross-sectional area of STr, a relationship such that $STr/a \leq 7.5$ is preferably satisfied with respect to the ratio STr/a. As a result, the volume of the first region of the tread rubber layer is suppressed to the necessary minimum, making it possible to greatly decrease the tire weight and rolling resistance without detracting from wear resistance.

An air penetration preventing layer having an air penetration coefficient that is no greater than $50 \times 10^{-12}$ cc·cm/$cm^2$·sec·cmHg is preferably provided in the tire interior and/or on the tire inner surface along the carcass layer. In particular, the air penetration preventing layer is preferably made of a thermoplastic resin or a thermoplastic elastomer composition obtained by blending a thermoplastic resin and an elastomer. Thus, the air penetration preventing layer having a low air penetration coefficient compared to a conventional air penetration preventing layer mainly made of butyl rubber is provided, making it possible to make the air penetration preventing layer thinner and achieve further weight reduction. It should be noted that the air penetration coefficient is a value measured under 30° C. temperature conditions compliant with JIS K 7126, "Testing method for gas transmission rate through plastic film and sheeting".

The reinforcement layer is preferably made of a ply having arranged therein a plurality of organic fiber cords. With the use of organic fiber cords in the reinforcement layer disposed in the tread portion, it is possible to achieve further weight reduction.

Further, a bead filler is preferably disposed on the outer periphery side of each bead core and, when the tire meridian cross section of the bead filler has a cross-sectional area of $S_{BFL}$, a relationship such that $0.10 \leq S_{BFL}/SC \leq 0.30$ is preferably satisfied with respect to the ratio $S_{BFL}/SC$. Thus, the cross-sectional area $S_{BFL}$ of the bead filler is made relatively small in the third region, making it possible to achieve further weight reduction.

In the present technology, the "pneumatic tire for a passenger vehicle" means a pneumatic tire for mounting as standard on a passenger vehicle excluding for emergency use, and excludes an emergency tire as well as a tire for racing.

Further, in the present technology, the tread profile is specified with the tire assembled onto a regular rim and inflated to a regular inner pressure. The regular rim is a rim defined by a standard for each tire according to a system of standards that includes standards on which tires are based, and refers to a "standard rim" in the case of the Japan Automobile Tyre Manufacturers Association (JATMA), a "design rim" in the case of the Tire and Rim Association (TRA), and a "measuring rim" in the case of the European Tyre and Rim Technical Organisation (ETRTO), for example. The regular inner pressure is the air pressure defined by standards for each tire according to a system of standards that includes standards on which tires are based, and refers to a maximum air pressure in the case of JATMA, a maximum value in the table of "TIRE ROAD LIMITS AT VARIOUS COLD INFLATION PRESSURES" in the case of TRA, and an "INFLATION PRESSURE" in the case of ETRTO. The regular inner pressure is 180 kPa for a tire on a passenger vehicle.

Furthermore, in the present technology, the cross-sectional areas of the first to third regions are projected areas in the tire circumferential direction of the tire meridian cross section. As a result, when a circumferential groove extending in the tire circumferential direction or a lug groove extending in the tire width direction exists in the tread portion, the section of the lug groove is included in the cross-sectional area while the section of the circumferential groove is excluded from the cross-sectional area.

BRIEF DESCRIPTION OF THE DRAWING(S)

DETAILED DESCRIPTION

Figure 1:
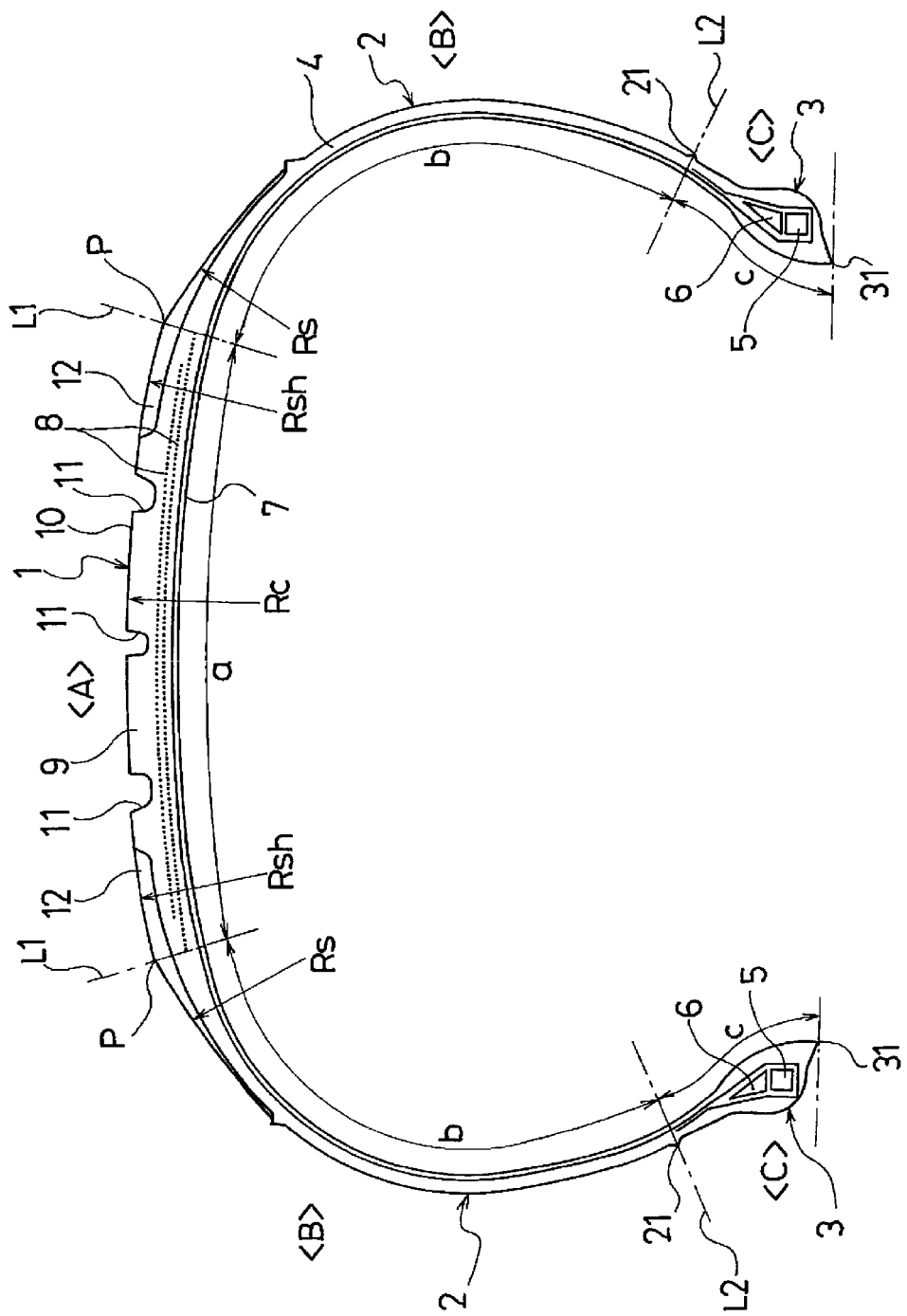
FIG. 1 is a meridian cross-sectional view illustrating a pneumatic tire according to an embodiment of the present technology.
Figure 2:
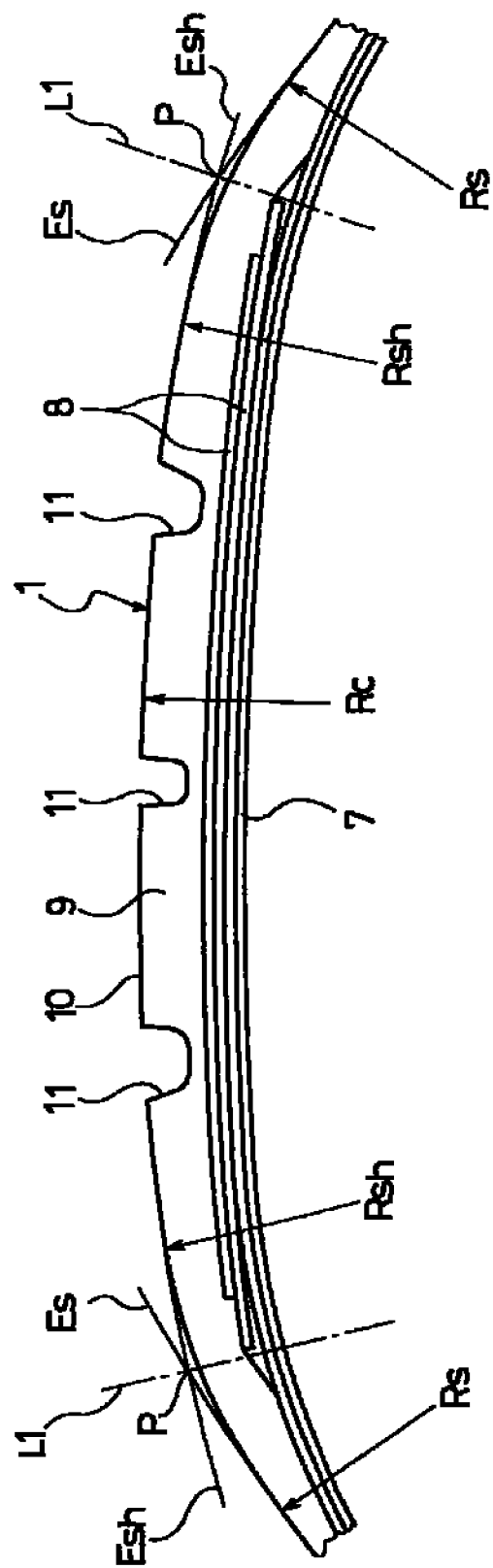
FIG. 2 is a cross-sectional view illustrating a magnified view of a tread portion of the pneumatic tire in FIG. 1.

Descriptions will be given below in detail of a configuration of the present technology with reference to the accompanying drawings. FIGS. 1 and 2 illustrate a pneumatic tire for a passenger vehicle according to an embodiment of the present technology.

As illustrated in FIG. 1, the pneumatic tire of the present embodiment includes a tread portion 1 extending in a tire circumferential direction to form an annular shape, a pair of side wall portions 2 disposed on both sides of the tread portion 1, and a pair of bead portions 3 disposed on inner sides in the tire radial direction of the side wall portions 2.

At least one carcass layer 4 including a plurality of carcass cords that extend in the tire radial direction is laid between the pair of bead portions 3, 3. For the carcass cords constituting the carcass layer 4, organic fiber cords made of nylon, polyester, or the like are preferably used. Annular bead cores 5 are embedded in the respective bead portions 3, and bead fillers 6 made of a rubber composition are disposed on the outer peripheries of the bead cores 5. The bead fillers 6 are disposed on the outer periphery sides of the bead cores 5 as needed to fill in gaps between the bead cores 5 and the carcass layer 4. While such bead fillers 6 may be either disposed or not disposed, the bead fillers 6 are preferably disposed to suppress failure during manufacturing. Nevertheless, from the viewpoint of weight reduction, when the bead fillers 6 are disposed, the cross-sectional area is preferably decreased to the extent possible. Further, an air penetration preventing layer 7 is provided on a tire inner surface along the carcass layer 4. Such an air penetration preventing layer 7 may be embedded in the tire inner surface along the carcass layer 4, or provided to both the tire inner surface and the tire interior.

Meanwhile, at least one reinforcement layer 8 that includes a plurality of aligned reinforcing cords is embedded in the outer periphery side of the carcass layer 4 of the tread portion 1. For the reinforcing cords of the reinforcement layer 8, steel cords may be used, but organic fiber cords, such as aramid, polyolefin ketone (POK), or polyethylene terephthalate (PET), are preferably used. In particular, the use of aramid fiber cords having high elasticity is preferred. Further, a composite cord (hybrid cord) obtained by combining and twisting together different types of organic fibers may be used. When the followability with respect to tire expansion and deformation during vulcanization is taken into consideration, utilization of a composite cord obtained by twisting together highly elastic aramid and nylon is preferred. A tread rubber layer 9 is stacked on the outer periphery side of the reinforcement layer 8. The tread rubber layer 9 may be a single layer structure, or may be a laminated structure of undertread and tread cap. A plurality of circumferential grooves 11 extending in the tire circumferential direction, and a plurality of lug grooves 12 extending in the tire width direction are formed on the tread portion 1 having such a tread rubber layer 9.

In the aforementioned pneumatic tire, a tread profile 10 that forms a contour of the tread portion 1 in the tire meridian cross section is formed by connecting a plurality of arcs including a center arc positioned in a center in the tire width direction of the tread portion 1 and having a radius Rc of curvature, a side arc positioned on the outermost side in the tire width direction of the tread portion 1 and having a radius Rs of curvature, and a shoulder arc positioned on the inner side in the tire width direction of the side arc and having a radius Rsh of curvature. The shoulder arc is an arc that defines the contour of a road contact surface of a land portion, positioned on the outermost side in the tire width direction of the tread portion 1, and the side arc is an arc that defines the contour of a side wall surface of the land portion, positioned on the outermost side in the tire width direction of the tread portion 1. The center arc and the shoulder arc may be common arcs or arcs that differ from each other. Additionally, another arc may be interposed between the center arc and the shoulder arc. The shoulder arc and the side arc may be connected so as to come into contact with each other, or may be connected so as to intersect each other. Additionally, another arc may be interposed between the shoulder arc and the side arc to smoothly connect the two.

Hence, as illustrated in FIG. 2, when straight lines are drawn on both sides in the tire width direction of the tread portion 1, each passing through a point P of intersection of an extension Es of the side arc and an extension Esh of the shoulder arc and orthogonal to the tire inner surface, a pair of first boundary lines L1 formed of these lines is defined. It should be noted that, when the shoulder arc and the side arc are directly connected, the point P of intersection is positioned on the tread profile 10.

Meanwhile, as illustrated in FIG. 1, each of the sidewall portions 2 has a rim check line 21 extending in the tire circumferential direction on the tire outer surface. The rim check line 21 is formed to verify the fitted state of the tire with respect to the rim, and normally forms a protrusion that protrudes from the tire outer surface. When straight lines are drawn passing through the rim check line 21 of each of the sidewall portions 2 in the tire meridian cross section and orthogonal to the tire inner surface, a pair of second boundary lines L2 formed of these lines is defined.

When a first region A is defined between the pair of first boundary lines L1, L1, a second region B is defined between the first boundary line L1 and the second boundary line L2, a third region C is defined from the second boundary line to a bead toe 31, the first region A, the second region B, and the third region C have cross-sectional areas (mm$^2$) of SA, SB, and SC, respectively, and the first region A, the second region B, and the third region C have periphery lengths (mm) of a, b, and c, respectively, along the tire inner surface, the above-described pneumatic tire is configured to satisfy relationships such that $7.5 \leq SA/a \leq 11.5$ and $2.0 \leq SB/b \leq 6.0$ with respect to the ratios SA/a and SB/b.

According to the aforementioned pneumatic tire, the relationships such that $7.5 \leq SA/a \leq 11.5$ and $2.0 \leq SB/b \leq 6.0$ are satisfied with respect to the ratios SA/a and SB/b, thereby suppressing volumes (substantial average thicknesses) of the first region A and the second region B of the pneumatic tire to necessary minimums, making it possible to greatly reduce the tire weight and to thus greatly decrease the rolling resistance without detracting from tire performance factors such as wear resistance and cut resistance. Hence, in the first region A corresponding to the tread portion 1, if the ratio SA/a is less than 7.5, the wear resistance decreases, while conversely, if the ratio SA/a is greater than 11.5, the weight reduction effect becomes inadequate. Further, in the second region B corresponding to the side wall portion 2, if the ratio SB/b is less than 2.0, the cut resistance decreases, while conversely, if the ratio SB/b is greater than 6.0, the weight reduction effect becomes inadequate.

In the above-described pneumatic tire, a relationship such that $4.0 \leq SC/c \leq 8.0$ with respect to the ratio SC/c is preferably satisfied. That is, the ratio SC/c is preferably made as small as possible by decreasing a number of wire windings of the bead core 5, decreasing the cross-sectional area of the bead filler 6, and decreasing a thickness of a rim cushion rubber layer. As a result, the volume of the third region C of the pneumatic tire is suppressed to the necessary minimum, making it possible to greatly decrease the tire weight and rolling resistance without detracting from fitting characteristics and particularly rim disengagement resistance. Hence, for the third region C corresponding to the bead portion 3, if the ratio SC/c is less than 4.0, the fitting characteristics deteriorate, while conversely, if the ratio SC/c is greater than 8.0, the weight reduction effect decreases.

It should be noted that while the suitable ranges of the cross-sectional area SA of the first region A, the cross-sectional area SB of the second region B, and the cross-sectional area SC of the third region C significantly differ in accordance with tire size, the aforementioned effects can be expected regardless of tire size by defining the ratios SA/a, SB/b, SC/c made of values obtained by respectively dividing these cross-sectional areas SA, SB, and SC by the periphery lengths a, b, and c of each region.

In the above-described pneumatic tire, when the first region A of the tread rubber layer 9 has a cross-sectional area of STr, a relationship such that $STr/a \leq 7.5$ is preferably satisfied, and a relationship such that $5.0 \leq STr/a \leq 7.0$ is more preferably satisfied with respect to the ratio STr/a. As a result, the volume (substantial average thickness) of the first region A of the tread rubber layer 9 is suppressed to the necessary minimum, making it possible to greatly decrease the tire weight and rolling resistance without detracting from wear resistance. Here, in the cross-sectional area STr of the first region A of the tread rubber layer 9, if the ratio STr/a is too small, the wear resistance decreases, while conversely, if the ratio STr/a is greater than 7.5, the weight reduction effect is small, resulting in a disadvantage in terms of rolling resistance. It should be noted that a case where STr/a=7.5 is equivalent to a tread structure having a groove depth of 5.0 mm and an under-groove rubber gauge of 2.5 mm.

In the above-described pneumatic tire, while the air penetration preventing layer 7 is disposed in the tire interior or on the tire inner surface along the carcass layer 4, the air penetration coefficient of this air penetration preventing layer 7 is preferably no greater than $50 \times 10^{-12}$ cc·cm/cm$^2$·sec·cmHg. In particular, the air penetration preventing layer 7 is preferably made of a thermoplastic resin or a thermoplastic elastomer composition obtained by blending a thermoplastic resin and an elastomer. Thus, the air penetration preventing layer 7 having a low air penetration coefficient compared to a conventional air penetration preventing layer mainly made of butyl rubber is provided, making it possible to make the air penetration preventing layer 7 thinner and achieve further weight reduction. Hence, if the air penetration coefficient of the air penetration preventing layer 7 is greater than $50 \times 10^{-12}$ cc·cm/cm$^2$·sec·cmHg, further weight reduction becomes difficult.

In the above-described pneumatic tire, the reinforcement layer 8 is preferably made of a ply having a plurality of organic fiber cords arranged therein. With the use of organic fiber cords in the reinforcement layer 8 disposed in the tread portion 1, it is possible to achieve further weight reduction.

For the reinforcement layer 8, a circumferential reinforcement layer in which a plurality of reinforcing cords are arranged substantially parallel in the tire circumferential direction, an inclined reinforcement layer in which a plurality of reinforcing cords are arranged to be inclined with respect to the tire circumferential direction, or a combination thereof may be used. In the case of the circumferential reinforcement layer, the angle of inclination of the reinforcing cords with respect to the tire circumferential direction is preferably no more than 5°, making it possible to enhance a fastening effect based on the reinforcement layer 8. The circumferential reinforcement layer preferably has a jointless structure in which a strip material made from at least a single reinforcing cord laid in parallel and covered with rubber is wound continuously in the circumferential direction of the tire. In the case of the inclined reinforcement layer, the angle of inclination of the reinforcing cords with respect to the tire circumferential direction is preferably within a range of from 20° to 50°, making it possible to increase a cornering power without increasing rolling resistance. Hence, if the angle of inclination of the reinforcing cords with respect to the tire circumferential direction is less than 20°, the increase in cornering power is insufficient, while conversely, if the angle of inclination is greater than 50°, an out-of-plane bending rigidity of the reinforcement layer 8 may decrease, causing an increase in rolling resistance.

Further, in the above-described pneumatic tire, when the tire meridian cross section of the bead filler 5 has a cross-sectional area of $S_{BFL}$, a relationship such that $0.10 \leq S_{BFL}/$ SC≤0.30 is preferably satisfied with respect to the ratio $S_{BFL}/SC$. Thus, the cross-sectional area $S_{BFL}$ of the bead filler 5 is made relatively small in the third region C, making it possible to achieve further weight reduction. Hence, in the cross-sectional area $S_{BFL}$ of the bead filler 5, if the ratio $S_{BFL}/SC$ is less than 0.10, the rigidity of the bead portion 3 is inadequate, while conversely, if the ratio $S_{BFL}/SC$ is greater than 0.30, the weight reduction effect decreases.

Furthermore, in the above-described pneumatic tire, a linear density of the carcass cords of the carcass layer 4 can be selected from the range of from 900 dtex/2 to 2000 dtex/2, for example, and a cord count per 50 mm unit width can be selected from the range of from 30 to 70 cords, for example. In particular, the linear density of the carcass cords of the carcass layer 4 is preferably from 900 dtex/2 to 1400 dtex/2, and the cord count per 50 mm unit width is preferably from 45 to 70 cords. That is, utilizing finer carcass cords makes it possible to make the carcass layer 4 thinner, thereby contributing to weight reduction, and increasing the carcass cord count makes it possible to ensure a necessary pressure resistance. Hence, if the linear density of the carcass cords is less than 900 dtex/2, ensuring pressure resistance is difficult, while conversely, if the linear density is greater than 1400 dtex/2, the weight reduction effect decreases.

The following describes a thermoplastic resin or a thermoplastic elastomer composition obtained by blending a thermoplastic resin and an elastomer that constitutes the air penetration preventing layer of the pneumatic tire of the present technology.

The thermoplastic resin to be used in the present technology is preferably a polyamide resin [e.g., nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, nylon 66/PPS copolymer] and an N-alkoxyalkyl compound thereof [e.g., a methoxymethyl compound of nylon 6, a methoxymethyl compound of a nylon 6/610 copolymer, or a methoxymethyl compound of nylon 612]; a polyester resin [e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a crystal polyester, a polyoxyalkylene diimide acid/polybutylene terephthalate copolymer]; a polynitrile resin [e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer], a polymethacrylate resin [e.g., polymethylmethacrylate (PMMA), polyethyl-methacrylic acid], a polyvinyl resin [e.g., polyvinyl acetate, a polyvinyl alcohol (PVA), a vinyl alcohol/ethylene copolymer (EVOH), polyvinylidene chloride (PDVC), polyvinylchloride (PVC), a vinyl chloride/vinylidene chloride copolymer, a vinylidene chloride/methylacrylate copolymer, a vinylidene chloride/acrylonitrile copolymer], a cellulose resin [e.g., cellulose acetate, cellulose acetate butyrate], a fluoride resin [e.g., polyvinylidene difluoride (PVDF), polyvinyl fluoride (PVF), polychlorofluoroethylene (PCTFE), a tetrafluoroethylene/ethylene copolymer (ETFE)], or an imide resin [e.g., an aromatic polyimide (PI)].

The elastomer to be used in the present technology preferably includes a diene-based rubber and a hydrogenate thereof [e.g., natural rubber (NR), isoprene rubber (IR), epoxidized natural rubber, styrene butadiene rubber (SBR), butadiene rubber (BR), high cis-BR, low cis-BR), nitrile rubber (NBR), hydrogenated NBR, hydrogenated SBR], an olefin rubber [e.g., ethylene propylene rubber (EPDM, EPM), maleic acid ethylene propylene rubber (M-EPM), butyl rubber (IIR), an isobutylene and aromatic vinyl or diene-based monomer copolymer, acrylic rubber (ACM), an ionomer], a halogen-containing rubber [e.g., Br-IIR, CI-IIR, an isobutylene-para-methylstyrene copolymer (Br-IPMS), chloroprene rubber (CR), a hydrin rubber (CHR), chlorosulfonated polyethylene rubber (CSM), chlorinated polyethylene rubber (CM), chlorinated polyethylene rubber modified with maleic acid (M-CM)], a silicon rubber [e.g., methyl vinyl silicon rubber, dimethyl silicon rubber, methylphenyl vinyl silicon rubber], a sulfur-containing rubber [e.g., polysulfide rubber], a fluororubber [e.g., a vinylidene fluoride rubber, a vinyl ether rubber containing fluoride, a tetrafluoroethylene-propylene rubber, a silicon-based rubber containing fluoride, a phosphazene rubber containing fluoride], and a thermoplastic elastomer [e.g., a styrene elastomer, an olefin elastomer, an ester elastomer, a urethane elastomer, a polyamide elastomer].

If compatibility varies between the above-described specified thermoplastic resin and the elastomer, a suitable compatibility agent can be used as a third component to bring the thermoplastic resin and the elastomer into compatibility. By mixing the compatibility agent into the blended system, interfacial tension between the thermoplastic resin and the elastomer will decrease, with the results that a diameter of rubber particles forming a dispersion phase will become fine in size, leading to the properties of both components being displayed more effectively. In general, such a compatibility agent has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) and a maleic acid modified compound thereof; an EPDM, EPM, EPDM/styrene or EPDM/acrylonitrile graft copolymer and a maleic acid modified compound thereof; a styrene/maleic acid copolymer, a reactive phenoxy, and the like. The blending quantity of such a compatibility agent, while not limited in particular, is preferably from 0.5 to 10 parts by weight with respect to 100 parts by weight of the polymer component (total of the thermoplastic resin and the elastomer).

A composition ratio of the specified thermoplastic resin and the elastomer in the thermoplastic elastomer composition, while not limited in particular, may be determined as appropriate to establish a dispersed structure as a discontinuous phase of the elastomer in the matrix of the thermoplastic resin, and is preferably a range of a weight ratio of from 90/10 to 15/85.

In the present technology, other polymers such as a compatibility agent described above may be blended into the thermoplastic resin and thermoplastic elastomer composition in a range that does not harm the characteristics required for an air penetration preventing layer. The purposes of mixing such a polymer are to improve the compatibility between the thermoplastic resin and the elastomer, to improve the molding processability of the material, to improve the heat resistance, to reduce cost, and the like. Examples of the material used for the polymer include polyethylene (PE), polypropylene (PP), polystyrene (PS), acrylonitrile butadiene styrene (ABS), styrene butadiene styrene (SBS), and polycarbonate (PC). Furthermore, a filler (calcium carbonate, titanium oxide, alumina, and the like), a reinforcing agent such as carbon black, or white carbon, a softening agent, a plasticizer, a processing aid, a pigment, a dye, an anti-aging agent, or the like generally compounded with polymer compounds may be optionally compounded so long as the characteristics required for an air penetration preventing layer are not harmed.

Furthermore, the elastomer can be dynamically vulcanized when being mixed with the thermoplastic resin. A vulcanizing agent, a vulcanization aid, vulcanization conditions (temperature, time), and the like, during the dynamic vulcanization can be determined as appropriate in accordance with the composition of the elastomer to be added, and are not particularly limited.

Generally available rubber vulcanizers (crosslinking agents) can be used as the vulcanizing agent. Specifically, as a sulfur vulcanizing agent, powdered sulfur, precipitated sulfur, highly dispersible sulfur, surface treated sulfur, insoluble sulfur, dimorpholine disulfide, alkylphenol disulfide, and the like can be illustrated, and, for example, approximately 0.5 to 4 phr (in the present specification, "phr" refers to parts by weight per 100 parts by weight of an elastomer component; the same will apply hereinafter) thereof can be used.

Additionally, examples of organic peroxide vulcanizing agents include benzoyl peroxide, t-butyl hydroperoxide, 2,4-dichlorobenzoyl peroxide, 2,5-dimethyl-2,5-di (t-butylperoxy)hexane, 2,5-dimethylhexane-2,5-di(peroxyl benzoate), and the like, and for example, approximately 1 to 20 phr thereof can be used.

Furthermore, examples of phenol resin vulcanizing agents include brominated alkylphenol resins and mixed cross-linked systems containing an alkyl phenol resin and a halogen donor such as tin chloride or chloroprene, and for example, approximately 1 to 20 phr thereof can be used.

Other examples of vulcanizing agents include zinc white (approximately 5 phr), magnesium oxide (approximately 4 phr), litharge (approximately from 10 to 20 phr), p-quinone dioxime, p-dibenzoylquinone dioxime, tetrachloro-p-benzoquinone, poly-p-dinitrosobenzene (approximately from 2 to 10 phr), and methylenedianiline (approximately from 0.2 to 10 phr).

As necessary, a vulcanization accelerator may be added. As the vulcanization accelerator, for example, approximately 0.5 to 2 phr of a generally available vulcanization accelerator of an aldehyde-ammonia base, a guanidine base, a thiazole base, a sulfenamide base, a thiuram base, a dithio acid salt base, a thiourea base, or the like can be used.

Specific examples include an aldehyde ammonia vulcanization accelerator such as hexamethylene tetramine; a guanidine vulcanization accelerator such as diphenyl guanidine; a thiazole vulcanization accelerator such as dibenzothiazyl disulfide (DM), 2-mercaptobenzothiazole and its Zn salt; and a cyclohexylamine salt; a sulfenamide vulcanization accelerator such as cyclohexyl benzothiazyl sulfenamide (CBS), N-oxydiethylene benzothiazyl-2-sulfenamide, N-t-butyl-2-benzothiazole sulfenamide, and 2-(thymol polynyl dithio)benzothiazole; a thiuram vulcanization accelerator such as tetramethylthiuram disulfide (TMTD), tetraethylthiuram disulfide, tetramethylthiuram monosulfide (TMTM), and dipentamethylenethiuram tetrasulfide; a dithionate vulcanization accelerator such as Zn-dimethyl dithiocarbamate, Zn-diethyl dithiocarbamate, Zn-n-butyl dithiocarbamate, Zn-ethylphenyl dithiocarbamate, Te-diethyl dithiocarbamate, Cu-dimethyl dithiocarbamate, Fe-dimethyl dithiocarbamate, and pipecoline pipecolyl dithiocarbamate; and a thiourea vulcanization accelerator such as ethylene thiourea and diethyl thiourea may be mentioned.

Additionally, a generally-used aid for a rubber can be used in conjunction as a vulcanization accelerator aid. For example, zinc white (approximately 5 phr), stearic acid, oleic acid and their Zn salts (approximately from 2 to 4 phr), or the like can be used.

The method for producing the thermoplastic elastomer composition is as follows. The thermoplastic resin and the elastomer (which is unvulcanized in the case of rubber) are melt-kneaded in advance using a biaxial kneader/extruder or the like. The elastomer is dispersed as a dispersed phase (domain) in the thermoplastic resin that forms a continuous phase (matrix). When the elastomer is vulcanized, the vulcanizing agent can be added during the kneading process to dynamically vulcanize the elastomer. Although the various compounding agents (except for the vulcanizing agent) may be added to the thermoplastic resin or the elastomer during the above-described kneading process, it is preferable to premix the compounding agents before the kneading process. The kneader used for kneading the thermoplastic resin and the elastomer is not particularly limited. A screw extruder, kneader, Banbury Mixer, biaxial kneader/extruder, or the like can be used as the kneader. Among these, a biaxial kneader/extruder is preferably used for kneading the thermoplastic resin and the elastomer and for dynamically vulcanizing the elastomer. Furthermore, two or more types of kneaders can be used to successively knead the thermoplastic resin and the elastomer. As a condition for the melt kneading, a temperature should be equal to or higher than a melting temperature of the thermoplastic resin. A shear rate when kneading is preferably from 1,000 to 7,500 $\sec^{-1}$. A total kneading time is from 30 seconds to 10 minutes. Additionally, when a vulcanizing agent is added, a vulcanization time after this addition is preferably from 15 seconds to 5 minutes. The polymer composition produced by the above-described method may be formed into a desired shape by a generally-used method for forming a thermoplastic resin such as injection molding and extrusion molding.

The thermoplastic elastomer composition thus obtained has a structure in which the elastomer is dispersed as a discontinuous phase in the matrix of the thermoplastic resin. By adopting such a structure, it is possible to provide both sufficient flexibility and sufficient rigidity due to an effect of the resin layer being the continuous phase. Furthermore, when molding, it is possible to obtain a molding processability equivalent to that of the thermoplastic resin regardless of the amount of the elastomer.

The Young's modulus of the thermoplastic resin and the thermoplastic elastomer composition in a standard atmosphere defined by JIS K 7100 is not particularly limited, but is preferably from 1 to 500 MPa, and more preferably from 50 to 500 MPa.

While the above-described thermoplastic resin or thermoplastic elastomer composition may be formed into a sheet or film and used as a single member, an adhesive layer may be stacked on the sheet or film for enhancing the adhesion of the sheet or film to the adjacent rubber. Specific examples of an adhesive polymer that constitutes the adhesive layer include an ultra-high molecular weight polyethylene (UHMWPE) having a molecular weight of not less than 1,000,000 and preferably not less than 3,000,000; acrylate copolymers such as ethylene-ethylacrylate copolymers (EEA), ethylene-methylacrylate resins (EMA), and ethylene-acrylic acid copolymers (EAA), and maleic anhydrate adducts thereof; polypropylene (PP) and maleic acid-modified products thereof; ethylene-propylene copolymers and maleic acid-modified products thereof; polybutadiene resins and maleic anhydrate-modified products thereof, styrene-butadiene-styrene copolymers (SBS); styrene-ethylene-butadiene-styrene copolymers (SEBS); thermoplastic fluororesins; thermoplastic polyester resins; and the like. These adhesive polymers can be formed into a sheet or film in accordance with the conventional method, for instance, by use of a resin extruder. A thickness of the adhesive layer is not particularly limited, but is preferably small in order to reduce tire weight; and is preferably from 5 µm to 150 µm.

EXAMPLES

As Conventional Example, Comparative Examples 1 to 4 and Working Examples 1 to 9, pneumatic tires with a tire size of 195/65R15 were produced by laying one carcass layer between a pair of bead portions, embedding a bead core in each bead portion, arranging a bead filler on the outer periphery side of each bead core, arranging two reinforcement layers on the outer periphery side of the carcass layer, stacking a tread rubber layer on the outer periphery side of the reinforcement layers, and providing an air penetration preventing layer on the tire inner surface in a way that: the ratios SA/a, SB/b, and SC/c found from the cross-sectional areas SA, SB, and SC (mm$^2$) of the first to third regions defined by the first boundary lines and the second boundary lines and the periphery lengths a, b, and c (mm), the ratio STr/a relating to the cross-sectional area STr of the first region of the tread rubber layer, the materials of the air penetration preventing layer, the air penetration coefficient of the air penetration preventing layer, the cord materials of the reinforcement layers, and the ratio $S_{BFL}$/SC relating to the cross-sectional area $S_{BFL}$ of the bead filler are different among the pneumatic tires as shown in Table 1 and Table 2.

The tire weight, rolling resistance, wear resistance, cut resistance, and rim disengagement resistance for these test tires were evaluated according to the following method and the results were shown in Table 1 and Table 2.

Tire Weight:

The weight of each test tire was measured. The evaluation results were expressed as indices taking the inverse of the measured values, with the Conventional Example being assigned an index of 100. Larger index values indicate lighter tire weight.

Rolling Resistance:

The test tires were each assembled on a wheel having a rim size of 15×6J which was mounted on a rolling resistance tester provided with an 854 mm-radius drum, and pre-driving was performed for 30 minutes at an air pressure of 210 kPa, a load of 4.82 kN, and a speed of 80 km/h, after which rolling resistance was measured under the same conditions. The evaluation results were expressed as indices taking the inverse of the measured values, with the Conventional Example being assigned an index of 100. Larger index values indicate lower rolling resistance.

Wear Resistance:

The test tires were each assembled on a wheel having a rim size of 15×6J which was mounted on a test vehicle, and driving was performed at an air pressure of 210 kPa with one occupant for 10,000 km on a dry road surface, after which the wear amount of each tire was measured. The evaluation results were expressed as indices taking the inverse of the measured values, with the Conventional Example being assigned an index of 100. Larger numerical values indicate better wear resistance. It should be noted that a wear resistance index value of 95 or larger means there is no problem in actual use.

Cut Resistance:

The test tires were each assembled on a wheel having a rim size of 15×6J which was mounted on a test vehicle and. The test vehicle was forced to repeatedly run on a 15-cm high curb at an angle of 30° five times at an air pressure of 210 and a speed of 10 km/h, after which the damage to the sidewall portion was measured. The evaluation results were expressed as a circle "o" when there were no side cuts at a level impacting travel, and as "x" when there were side cuts at a level impacting travel.

Rim Disengagement Resistance:

The test tires were each assembled on a wheel having a rim size of 15×6J which was mounted on a test vehicle, an initial air pressure was set to 210 kPa, 80% of the JIS normal load was applied, and driving was performed on a circle course having a radius of 25 m at a speed of 60 km/h while reducing the air pressure by 10 kPa, and the air pressure was measured when the rim was disengaged. The evaluation results were expressed as a circle "o" when there was no rim disengagement at an air pressure in a range not impacting travel, and as an "x" when there was rim disengagement.

TABLE 1

|  | Conventional Example | Working Example 1 | Working Example 2 | Working Example 3 |
|---|---|---|---|---|
| SA/a | 13.4 | 9.4 | 11.0 | 9.4 |
| SB/b | 7.6 | 4.0 | 4.0 | 5.5 |
| SC/c | 9.2 | 9.2 | 9.2 | 9.2 |
| STr/a | 8.8 | 7.1 | 8.8 | 7.1 |
| Material of air penetration preventing layer | Rubber | Rubber | Rubber | Rubber |
| Air penetration coefficient of air penetration preventing layer (×10$^{-12}$ cc · cm/cm$^2$ · sec · cmHg) | 100 | 100 | 100 | 100 |
| Cord material of reinforcement layer | Steel | Steel | Steel | Steel |
| $S_{BFL}$/SC | 0.35 | 0.35 | 0.35 | 0.35 |
| Tire weight (index) | 100 | 110 | 108 | 108 |
| Rolling resistance (index) | 100 | 110 | 108 | 108 |
| Abrasion resistance (index) | 100 | 98 | 99 | 98 |
| Cut resistance | o | o | o | o |
| Rim disengagement resistance | o | o | o | o |

TABLE 1

|  | Comparative Example 1 | Comparative Example 2 | Comparative Example 3 | Comparative Example 4 |
|---|---|---|---|---|
| SA/a | 7.0 | 13.4 | 9.4 | 9.4 |
| SB/b | 4.0 | 4.0 | 1.5 | 7.6 |
| SC/c | 9.2 | 9.2 | 9.2 | 9.2 |
| STr/a | 4.0 | 8.8 | 7.1 | 7.1 |
| Material of air penetration | Rubber | Rubber | Rubber | Rubber |

TABLE 1-continued

|  | Comparative Example 1 | Comparative Example 2 | Comparative Example 3 | Comparative Example 4 |
|---|---|---|---|---|
| preventing layer |  |  |  |  |
| Air penetration coefficient of air penetration preventing layer ($\times 10^{-12}$ cc·cm/cm²·sec·cmHg) | 100 | 100 | 100 | 100 |
| Cord material of reinforcement layer | Steel | Steel | Steel | Steel |
| $S_{BFL}/SC$ | 0.35 | 0.35 | 0.35 | 0.35 |
| Tire weight (index) | 117 | 105 | 112 | 105 |
| Rolling resistance (index) | 117 | 105 | 112 | 105 |
| Abrasion resistance (index) | 90 | 100 | 98 | 98 |
| Cut resistance | ○ | ○ | x | ○ |
| Rim disengagement resistance | ○ | ○ | ○ | ○ |

TABLE 2

|  | Working Example 4 | Working Example 5 | Working Example 6 | Working Example 7 | Working Example 8 | Working Example 9 |
|---|---|---|---|---|---|---|
| SA/a | 9.4 | 9.0 | 8.7 | 8.6 | 8.6 | 8.6 |
| SB/b | 4.0 | 4.0 | 3.7 | 3.6 | 3.6 | 3.6 |
| SC/c | 6.3 | 6.3 | 6.1 | 6.0 | 6.0 | 4.0 |
| STr/a | 7.1 | 5.0 | 5.0 | 5.0 | 5.0 | 5.0 |
| Material of air penetration preventing layer | Rubber | Rubber | Rubber | Resin | Resin | Resin |
| Air penetration coefficient of air penetration preventing layer ($\times 10^{-12}$ cc·cm/cm²·sec·cmHg) | 100 | 100 | 50 | 10 | 10 | 10 |
| Cord material of reinforcement layer | Steel | Steel | Steel | Steel | Aramid | Aramid |
| $S_{BFL}/SC$ | 0.35 | 0.35 | 0.35 | 0.35 | 0.35 | 0.15 |
| Tire weight (index) | 112 | 114 | 116 | 117 | 118 | 120 |
| Rolling resistance (index) | 112 | 114 | 116 | 117 | 118 | 120 |
| Abrasion resistance (index) | 98 | 97 | 96 | 96 | 96 | 96 |
| Cut resistance | ○ | ○ | ○ | ○ | ○ | ○ |
| Rim disengagement resistance | ○ | ○ | ○ | ○ | ○ | ○ |

As clearly shown in Table 1 and Table 2, the tires of Working Examples 1 to 9 achieved significant reductions in tire weight and rolling resistance compared to the Conventional Example, without detracting from tire performance factors such as wear resistance, cut resistance, and rim disengagement resistance.

On the other hand, the tire of Comparative Example 1, having too small of a ratio SA/a, exhibited significant deterioration in wear resistance. The tire of Comparative Example 2, having too large of a ratio SA/a, exhibited an inadequate effect of improving tire weight and rolling resistance. The tire of Comparative Example 3, having too small of a ratio SB/b, exhibited significant deterioration in cut resistance. The tire of Comparative Example 4, having too large of a ratio SB/b, exhibited an inadequate effect of improving tire weight and rolling resistance.

What is claimed is:
1. A pneumatic tire for a passenger vehicle, comprising:
a tread portion extending in a tire circumferential direction to form an annular shape;
a pair of side wall portions disposed on both sides of the tread portion;
a pair of bead portions disposed on inner sides in a tire radial direction of the side wall portions;
at least one carcass layer laid between the pair of bead portions, a bead core embedded in each bead portion, at least one reinforcement layer disposed on an outer periphery side of the carcass layer, and a tread rubber layer stacked on an outer periphery side of the reinforcement layer; and
an air penetration preventing layer having an air penetration coefficient that is no less than $30 \times 10^{-12}$ cc·cm/cm²·sec·cmHg and no greater than $50 \times 10^{-12}$ cc·cm/cm²·sec·cmHg provided in a tire interior and/or on a tire inner surface along the carcass layer; wherein
when a tread profile which forms a contour of the tread portion in a tire meridian cross section includes side arcs positioned on outermost sides in a tire width direction of the tread portion, and shoulder arcs posi- tioned on inner sides in the tire width direction of the side arcs; a pair of first boundary lines is defined, each passing through a point of intersection of an extension of the side arc and an extension of the shoulder arc and orthogonal to the tire inner surface; the side wall portions each include a rim check line that extends in a tire circumferential direction; a pair of second boundary lines is defined, each passing through the rim check line in the tire meridian cross section and orthogonal to the tire inner surface; a first region is defined between the pair of first boundary lines; a second region is defined between the first boundary line and the second boundary line; a third region is defined extending from the second boundary line to a bead toe; the first to the third regions have cross-sectional areas (mm$^2$) of SA, SB, and SC, respectively; and the first to the third regions have periphery lengths (mm) of a, b, and c, respectively, along the tire inner surface, relationships such that $7.5 \leq SA/a \leq 11.5$ and $2.0 \leq SB/b \leq 6.0$ are satisfied with respect to ratios SA/a and SB/b;

a relationship such that $4.0 \leq SC/c \leq 8.0$ is satisfied with respect to a ratio SC/c;

a linear density of carcass cords of the carcass layer is from 900 dtex/2 to 1400 dtex/2;

a cord count per 50 mm unit width of the carcass layer is from 52 to 70 cords;

a relationship such that $STr/a \leq 7.5$ is satisfied with respect to a ratio STr/a, where STr is a cross-sectional area of the first region of the tread rubber layer;

a bead filler is disposed on an outer periphery side of each of the bead cores; and when the tire meridian cross section of the bead filler has a cross-sectional area of $S_{BFL}$, a relationship such that $0.10 \leq S_{BFL}/SC \leq 0.30$ is satisfied with respect to a ratio $S_{BFL}/SC$.

2. The pneumatic tire for a passenger vehicle according to claim 1, wherein a relationship such that $5.0 \leq SC/c \leq 7.0$ is satisfied with respect to a ratio SC/c.

3. The pneumatic tire for a passenger vehicle according to claim 1, wherein an air penetration preventing layer provided in a tire interior and/or on the tire inner surface along the carcass layer is made of a thermoplastic resin or a thermoplastic elastomer composition obtained by blending a thermoplastic resin and an elastomer.

4. The pneumatic tire for a passenger vehicle according to claim 1, wherein the reinforcement layer is made of a ply having a plurality of organic fiber cords arranged therein.

5. The pneumatic tire for a passenger vehicle according to claim 1, wherein a bead filler is disposed on an outer periphery side of each of the bead cores and a height of the bead filler in the tire radial direction is less than a height of the rim check line in the tire radial direction.

6. The pneumatic tire for a passenger vehicle according to claim 1, wherein the air penetration preventing layer is provided on the tire inner surface along the carcass layer.

7. The pneumatic tire for a passenger vehicle according to claim 1, wherein the cord count per 50 mm unit width of the carcass layer is from 60 to 70 cords.

8. The pneumatic tire for a passenger vehicle according to claim 1, wherein the air penetration preventing layer is provided in the tire interior.

9. The pneumatic tire for a passenger vehicle according to claim 8, wherein the air penetration preventing layer is made of a thermoplastic resin or a thermoplastic elastomer composition obtained by blending a thermoplastic resin and an elastomer.

10. The pneumatic tire for a passenger vehicle according to claim 9, wherein the reinforcement layer is made of a ply having a plurality of organic fiber cords arranged therein.

\* \* \* \* \*